US011940417B2

United States Patent
Li et al.

(10) Patent No.: US 11,940,417 B2
(45) Date of Patent: Mar. 26, 2024

(54) SYSTEMS AND METHODS FOR MACHINE LEARNING BASED FLEXURAL WAVE ABSORBER

(71) Applicant: Toyota Motor Engineering & Manufacturing North America, Inc., Plano, TX (US)

(72) Inventors: Xiaopeng Li, Ann Arbor, MI (US); Taehwa Lee, Ann Arbor, MI (US); Hideo Iizuka, Ann Arbor, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 132 days.

(21) Appl. No.: 17/165,390

(22) Filed: Feb. 2, 2021

(65) Prior Publication Data
US 2022/0244221 A1 Aug. 4, 2022

(51) Int. Cl.
*G01N 29/07* (2006.01)
*G01N 29/11* (2006.01)
*G06N 3/08* (2023.01)

(52) U.S. Cl.
CPC ............ *G01N 29/07* (2013.01); *G01N 29/11* (2013.01); *G06N 3/08* (2013.01); *G01N 2291/101* (2013.01)

(58) Field of Classification Search
CPC .. G01N 29/07; G01N 29/11; G01N 2291/101; G06N 3/08
See application file for complete search history.

(56) References Cited

U.S. PATENT DOCUMENTS

| | | | | |
|---|---|---|---|---|
| 4,223,282 A | * | 9/1980 | de Boer | H04N 9/7908 386/E9.006 |
| 4,308,751 A | | 1/1982 | Thurner et al. | |
| 5,418,858 A | * | 5/1995 | Shoureshi | G10K 11/17883 381/71.12 |
| 5,705,956 A | * | 1/1998 | Neely | H03L 7/085 331/25 |

(Continued)

FOREIGN PATENT DOCUMENTS

JP 2007091104 A 4/2007

OTHER PUBLICATIONS

Tanaka et al., 1992, "Active Wave Control of a Flexible Beam", JSME International Journal, Ser. III, vol. 35, No. 2, pp. 236-244 (Year: 1992).*

(Continued)

*Primary Examiner* — Mohamed Charioui
*Assistant Examiner* — Lyudmila Zaykova-Feldman
(74) *Attorney, Agent, or Firm* — Christopher G. Darrow; Darrow Mustafa PC (57) ABSTRACT

A flexural wave absorption system detects, with a sensor attached to a beam, an incident wave propagating in the beam. The system determines, based on a signal from the sensor generated in response to the incident wave, an amplitude and phase of the incident wave propagating in the beam and controls an actuator connected to the beam to generate a suppression wave, based on the amplitude and the phase of the incident wave, that reduces a coefficient of reflection of the incident wave across a broadband frequency range.

20 Claims, 5 Drawing Sheets

(56) References Cited

U.S. PATENT DOCUMENTS

| | | | | |
|---|---|---|---|---|
| 5,713,438 | A * | 2/1998 | Rossetti | F16F 7/108 267/140.14 |
| 5,828,812 | A * | 10/1998 | Khan | G06N 3/043 706/900 |
| 5,902,252 | A * | 5/1999 | Hohlfeld | A61B 5/121 73/585 |
| 6,018,689 | A * | 1/2000 | Kumura | F16F 15/02 702/56 |
| 8,868,221 | B1 * | 10/2014 | Mealy | G05B 13/027 706/14 |
| 2002/0003915 | A1 * | 1/2002 | Sorin | H04J 14/0221 385/28 |
| 2004/0030664 | A1 * | 2/2004 | Kotoulas | G10K 11/178 706/22 |
| 2004/0050999 | A1 * | 3/2004 | Hill | G05D 19/02 244/17.27 |
| 2005/0232435 | A1 * | 10/2005 | Stothers | G10K 11/17879 381/71.7 |
| 2006/0162998 | A1 * | 7/2006 | Hawkins | G10K 11/175 181/293 |
| 2008/0262806 | A1 * | 10/2008 | Vau | G05B 17/02 703/2 |
| 2010/0117993 | A1 * | 5/2010 | Kent | G06F 3/0418 345/177 |
| 2013/0204820 | A1 | 8/2013 | Hunzinger et al. | |
| 2013/0304683 | A1 * | 11/2013 | Lo | G06N 3/088 706/20 |
| 2016/0109412 | A1 | 4/2016 | Borigo et al. | |
| 2016/0299106 | A1 | 10/2016 | Khajeh et al. | |
| 2017/0234837 | A1 * | 8/2017 | Hall | B06B 3/00 73/602 |
| 2020/0211527 | A1 * | 7/2020 | Sheng | G10K 11/172 |

OTHER PUBLICATIONS

Spencer et al., 1998, "An Adaptive Neurocontroller for Vibration Suppression and Shape Control of a Flexible Beam", JIMSS, vol. 9, pp. 160-170 (Year: 1998).*

Qiu et al., 2009, "Active vibration control of a flexible beam using a non-collocated acceleration sensor and piezoelectric patch actuator", JSV, V. 326, Iss.3-5, pp. 438-455 (Year: 2009).*

Shin et al., "Active Vibration Control of Beams Using Filtered-Velocity Feedback Controllers with Moment Pair Actuators", 2013, Journal of Sound and Vibration, 332, pp. 2910-2922 (Year: 2013).*

Yang et al., 2021, "A Recurrent Neural Network-Based Method for Dynamic Load Identification of Beam Structures", Materials, 14, p. 7846 (Year: 2021).*

Von Flotow, A. H. and Shafer, B. E., 1986, Wave Absorbing Controllers for a Flexible Beam, J. Guidance, vol. 9, No. 6, p. 673-680. (Year: 1986).*

Hassan M. El-Khatib, "Control of flexural waves on a beam using a self-tuning vibration absorber", 2005, Thesis submitted for the degree of Doctor of Philosophy, Univ. of Southhampton pp. 1-173 (Year: 2005).*

Rustighi E. et al., 2011, An Adaptive Anechoic Termination for Active Vibration Control, Journal of Vibration and Control, 17(13), pp. 2066-2078. (Year: 2011).*

Wang et al., "Adaptive Vibration Control for a Cantilevered Beam Using Actuating and Sensing Functions of a Piezoelectric Bimorph," Vibroengineering PROCEDIA, vol. 20, 2018, 7 pages.

Spencer et al., "An Adaptive Neurocontroller for Vibration Suppression and Shape Control of a Flexible Beam," Journal of Intelligent Material Systems and Structures, 6 pages, 1998 (Abstract).

Xia, "Experimental Implementation of Artificial Neural Network-Based Active Vibration Control & Chatter Suppression," Ryerson University, A Dissertation by Yong Xia (2010).

Chen et al., "Enhanced flexural wave sensing by adaptive gradient-index metamaterials," Scientific Reports, 6, Article No. 35048, 11 pages (2016).

Leng, "Controlling flexural waves using subwavelength perfect absorbers: application to Acoustic Black Holes," Acoustics [physics.class-ph]. Universitédu Maine, 2019, 145 pages.

Beck et al., "Experimental analysis of a cantilever beam with a shunted piezoelectric periodic array," Journal of Intelligent Material Systems and Structures, SAGE Publications, 2011, 22 (11), 23 pages.

Qiu et al., "Vibration suppression of a flexible piezoelectric beam using BP neural network controller," Acta Mechanica Solida Sinica, vol. 25, Issue 4, pp. 417-428, 2012 (Abstract).

Wang et al., "Multi-resonant piezoelectric shunting induced by digital controllers for subwavelength elastic wave attenuation in smart metamaterial," 21 pages, arXiv:1607.07146v1 [cond-mat.mtrl-sci] Jul. 25, 2016.

* cited by examiner

SYSTEMS AND METHODS FOR MACHINE LEARNING BASED FLEXURAL WAVE ABSORBER

TECHNICAL FIELD

The subject matter described herein relates, generally, to systems and methods for absorbing a flexural wave, and more particularly, to systems and methods that use machine learning techniques to actively measure flexural waves and then generate an appropriate cancellation wave that effectively absorbs the flexural wave.

BACKGROUND

Some forms of sound radiation are caused by bending or flexural waves, which deform a structure transversely as the flexural waves propagate. Flexural waves are more complicated than compressional or shear waves and depend on material properties as well as geometric properties. Flexural waves are also dispersive since different frequencies travel at different speeds.

Conventional solutions for mitigating flexural waves include the use of passive dampening materials. For example, soft material such as rubbers, polymeric foams or elastomers may be utilized to reduce the impact the flexural wave has on a structure. However, such solutions tend to employ a one-size-fits-all approach and do not adapt to the presence of flexural waves acting on the mechanical structure. The absorption ability of such conventional solutions is largely reduced as flexural wave frequency decreases. Furthermore, conventional solutions of this type can add a considerable amount of weight to a target system.

SUMMARY

The disclosed apparatuses, methods and systems relate to a flexural wave absorption system that can nearly totally absorb incident flexural waves on a beam at a broad bandwidth.

In one embodiment, a flexural wave absorption system, includes a sensor connected to a beam, an actuator connected to the beam, a processor, and a memory communicably coupled to the processor. The processor stores a wave module including instructions that when executed by the processor cause the processor to determine an amplitude and phase of an incident wave propagating in the beam based on a signal from the sensor and control the actuator to generate a suppression wave, based on the amplitude and the phase of the incident wave, that reduces a coefficient of reflection of the incident wave.

The memory can further store a neural network module including instructions that when executed by the processor cause the processor to control the actuator to generate a cancellation wave based on a feedback signal, from the sensor, that indicates multiple wave components present in the beam including the suppression wave, the incident wave and a reflected wave resulting from the incident wave reflecting from an end of the beam. The cancellation wave can cancel the wave components indicated by the feedback signal.

In one embodiment, a method of absorbing a flexural wave includes detecting, with a sensor attached to a beam, an incident wave propagating in the beam, determining, based on a signal from the sensor generated in response to the incident wave, an amplitude and phase of the incident wave, and controlling an actuator connected to the beam to generate a suppression wave, based on the amplitude and the phase of the incident wave, that reduces a coefficient of reflection of the incident wave.

The method can further include controlling the actuator to generate a cancellation wave based on a feedback signal, from the sensor, that indicates multiple wave components present in the beam including the suppression wave, the incident wave and a reflected wave resulting from the incident wave reflecting from an end of the beam. The cancellation wave can cancel the wave components indicated by the feedback signal.

In one embodiment, a non-transitory computer-readable medium for absorbing a flexural wave, includes instructions that, when executed by one or more processors, cause the one or more processors to detect, with a sensor attached to a beam, an incident wave propagating in the beam, determine, based on a signal from the sensor generated in response to the incident wave, an amplitude and phase of the incident wave, and control an actuator connected to the beam to generate a suppression wave, based on the amplitude and the phase of the incident wave, that reduces a coefficient of reflection of the incident wave.

The non-transitory computer-readable medium can further include instructions to control the actuator to generate a cancellation wave based on a feedback signal, from the sensor, that indicates multiple wave components present in the beam including the suppression wave, the incident wave and a reflected wave resulting from the incident wave reflecting from an end of the beam. The cancellation wave can cancel the wave components indicated by the feedback signal.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa Furthermore, elements may not be drawn to scale.

DETAILED DESCRIPTION

Systems, methods, and other embodiments associated with absorbing a flexural wave (e.g., traveling through a beam) are disclosed. The disclosed embodiments provide numerous advantages over conventional approaches to mitigating vibrations and flexural waves. Without limitation, the disclosed embodiments provide a broad bandwidth of flexural wave absorption, especially at low frequencies, a model-free control unit that relaxes constraints on a length of the mechanical structure (e.g., a beam, a pipe, etc.), and can be used for total flexural wave absorbing as well as vibration suppression. The disclosed embodiments are model-free and can be used on structures of different lengths.

Figure 1A:
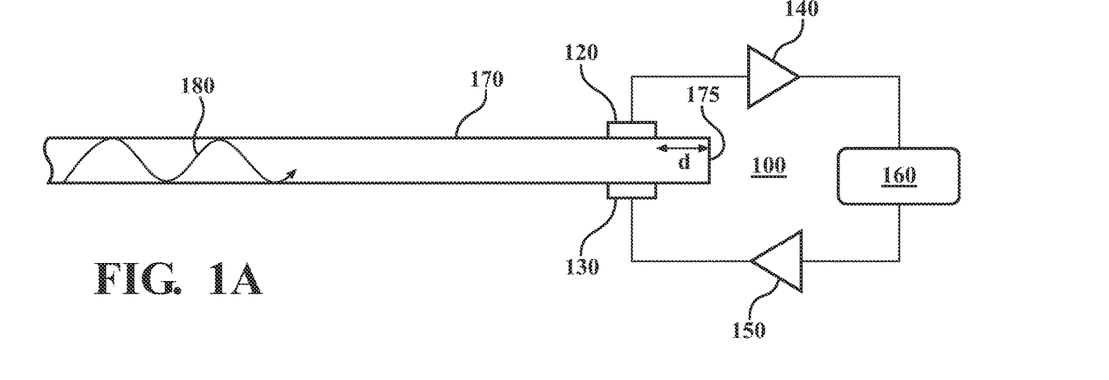
FIG. 1A illustrates an implementation scenario of a flexural wave absorption system, according to the disclosed subject matter.

Referring to FIG. 1A, an example implementation of the disclosed flexural wave absorption system 100 is illustrated. The system 100 includes multiple elements. It should be understood that in various embodiments the system 100 may not necessarily include all of the elements shown in FIG. 1A. The system 100 can have any combination of the various elements shown in FIG. 1A. Further, the system 100 can have other elements in addition to those shown in FIG. 1A. In some arrangements, the system 100 may be implemented without one or more of the elements shown in FIG. 1A. While the various elements are shown as being located within the system 100 in FIG. 1A, it should be understood that one or more of these elements can be located external to the system 100. Further, the elements shown may be physically separated by large distances.

Some of the possible elements of the disclosed flexural wave absorption system 100 are shown in FIG. 1A and will be described along with subsequent figures. For simplicity and clarity of illustration, where appropriate, reference numerals have been repeated among the different figures to indicate corresponding or analogous elements. In addition, while the discussion outlines numerous specific details to provide a thorough understanding of the embodiments described herein, those of ordinary skill in the art will understand that the embodiments described herein may be practiced using various combinations of these elements.

In any case, in one or more embodiments the disclosed flexural wave absorption system 100 can include a sensor 120 (e.g., a first piezoelectric patch), an actuator 130 (e.g., a second piezoelectric patch), a charge amplifier 140, a voltage amplifier 150, and a controller with an analog-to-digital converter (ADC) and a digital-to-analog converter (DAC) 160. The sensor 120 and the actuator 130 can be connected to a mechanical structure, which will be referred to herein as a beam 170. Although the mechanical structure is referred to and illustrated as a beam 170, the mechanical structure may be a pipe or other structure that can be subject to transmitting flexural waves 180. In one or more embodiments, the sensor 120 and the actuator 130 can be connected to the beam 170 near a distal end 175 of the beam 170, at distance d from the distal end 175 of the beam 170 or at the distal end 175. The distal end 175 can also be tapered to have a variation of the geometric properties according to a spatial power law profile. The noted functions and methods associated with the disclosed embodiments will become more apparent in the following discussion of the figures.

Figure 2:
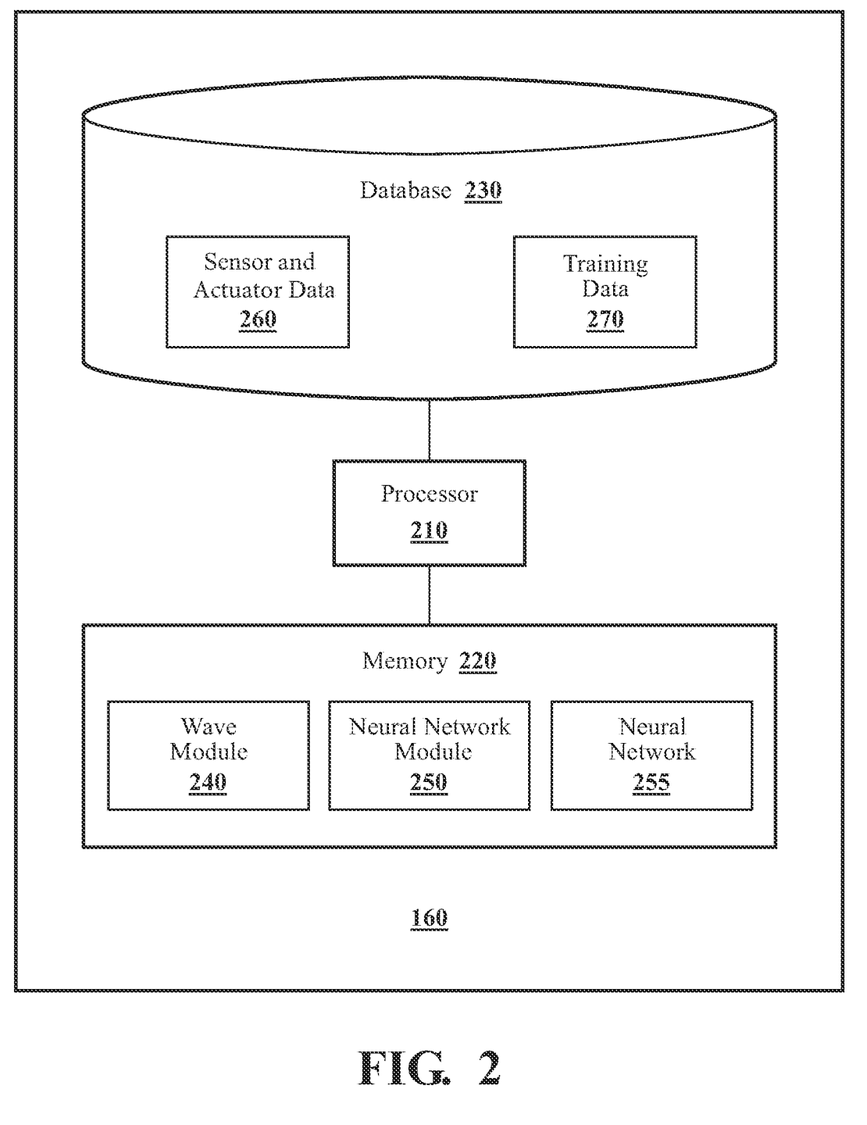
FIG. 2 illustrates one embodiment of a controller of a flexural wave absorption system, according to the disclosed subject matter.

With reference to FIG. 2, one embodiment of an implementation of the controller 160 of FIG. 1A is illustrated. The controller 160 is shown as including a processor 210. The processor 210 may be a part of the controller 160, the controller 160 may include a processor separate from the processor 210 of the system 100 or the controller 160 may access the processor 210 through a data bus or another communication path.

The controller 160 includes a database 230 that stores, among other things, sensor and actuator data 260 (e.g., data obtained from the sensor 120) and training data 270 (e.g., time-series data generated to train the neural network 255), as will be discussed further below. The database 230, in one embodiment, is constructed as an electronic data structure stored in the memory 220 or another data store, such as a cloud-based storage, a removable memory device, or another suitable location that is accessible to the modules 240 and 250. The database 230 is configured with routines that can be executed by the processor 210 for analyzing stored data, providing stored data, organizing stored data, and so on. Thus, in one embodiment, the database 230 stores data described above (as well as other data) used by the modules 240 and 250 in executing various functions.

Additionally, the controller 160, in one or more embodiments, includes a memory 220 that stores a wave module 240 and a neural network module 250. The memory 220 can be constructed as a random-access memory (RAM), a read-only memory (ROM), a hard-disk drive, a flash memory, or other suitable memory for storing the modules 240 and 250 and neural network 255.

The modules 240 and 250 are, for example, constructed as computer-readable instructions that when executed by the processor 210 cause the processor 210 to perform the various functions disclosed herein.

The wave module 240 is generally constructed including instructions that function to control the processor 210 to determine an amplitude and a phase of an incident wave 180 traveling in the beam 170 based on a detection signal from the sensor 120 and control the actuator 130 to generate a suppression wave 190, based on the amplitude and the phase of the incident wave 180, that reduces a coefficient of reflection of the incident wave 180. In one or more embodiments, the suppression wave 190 is generated to have an amplitude that is equal or nearly equal to the incident wave 180 and an opposite phase.

The neural network module 250 is generally constructed including instructions that function to control the processor 210 to input a feedback (sensing) signal from the sensor 120 into the neural network 255, which in response outputs a signal to control the actuator 130 to generate a cancellation wave. The feedback signal can indicate multiple wave components present in the beam 170, including the suppression wave 190, the incident wave 180 and a reflected wave 185 that results from the incident wave 180 reflected from an end of the beam 170. The cancellation wave absorbs, or cancels, the wave components indicated by the feedback signal.

In order to obtain the capability to generate the cancellation wave, in one or more embodiments the neural network module 250 trains the neural network 255 across a broad bandwidth of frequencies to determine a transfer function between the actuator 130 and the sensor 120, as will be discussed further below.

FIGS. 1A-1D illustrate stages of the disclosed flexural wave absorption system 100 detecting and responding to a flexural wave. As shown in FIG. 1A, a flexural wave (e.g., incident wave 180) is propagating through the beam 170.

Figure 1B:
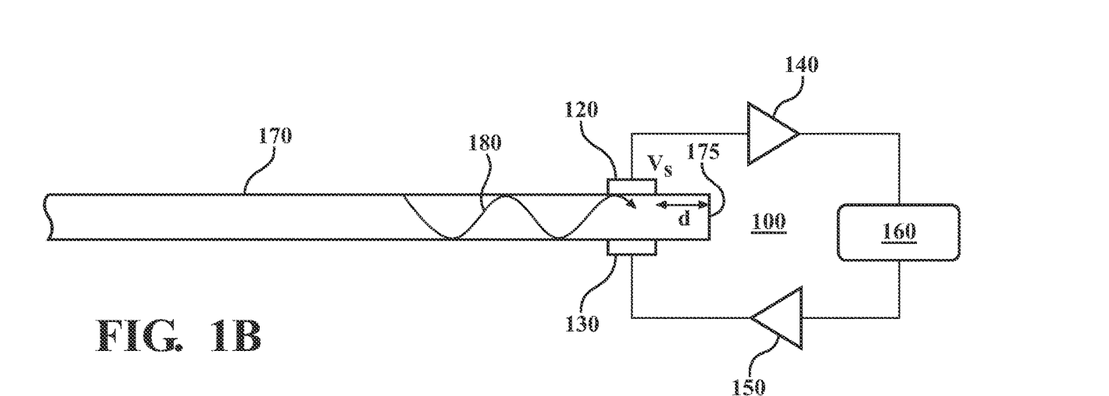
FIG. 1B illustrates an implementation scenario of a flexural wave absorption system detecting an incident wave, according to the disclosed subject matter.

As shown in FIG. 1B, in one or more embodiments the sensor 120 generates a voltage signal $V_s$ in response to the incident wave 180. The charge amplifier 140 converts charges to a sensing voltage $V_s$ and an ADC (e.g., in the controller 160) converts the sensing voltage $V_s$ to a digital signal and transmits the digital signal to the controller 160. The wave module 240 can store the digital signal as sensor and actuator data 260. Based on the sensor and actuator data 260, in a relatively brief period of time the wave module 240 can determine an amplitude and a phase of the incident wave 180 response.

Figure 1C:
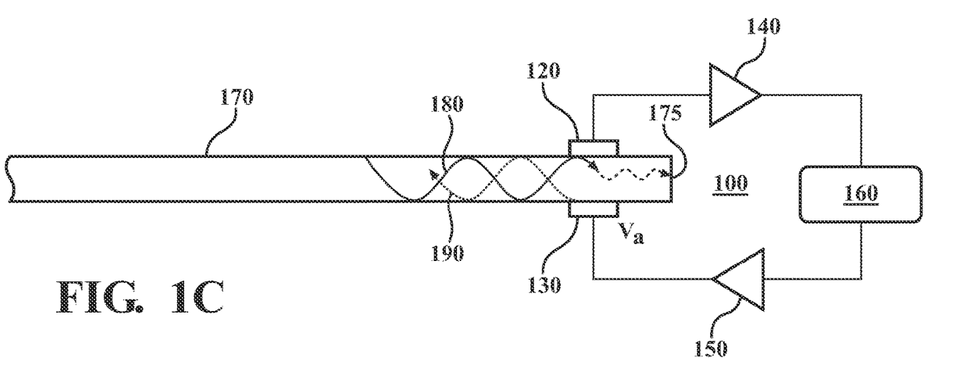
FIG. 1C illustrates an implementation scenario of a flexural wave absorption system generating a suppression wave, according to the disclosed subject matter.

As shown in FIG. 1C, in response to detecting the incident wave 180, the wave module 240 can generate a voltage $V_a$, based on $V_s$, at a time to generate a suppression wave 190 having an equal or nearly equal amplitude as the incident wave and an opposite phase. The suppression wave 190 counters the incident wave 180 as it continues toward the end of the beam 170 and thereby reduces the reflection coefficient of the incident wave 180, but may not completely absorb the incident wave 180 due to various dynamic factors, particularly at extremely low frequencies.

Figure 1D:
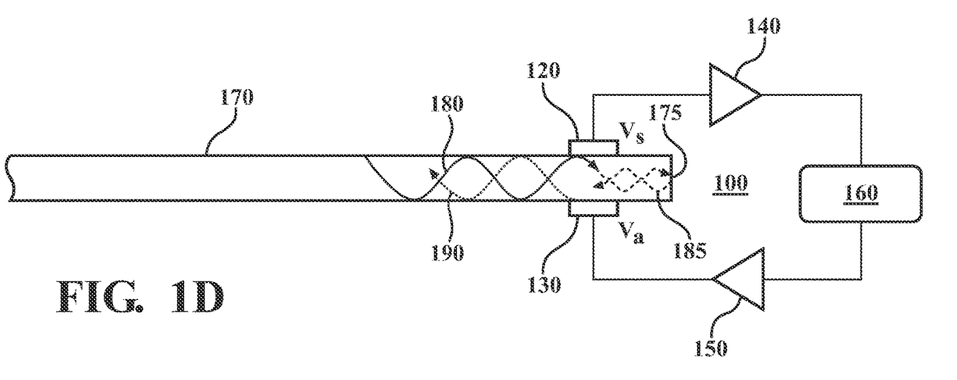
FIG. 1D illustrates an implementation scenario of a flexural wave absorption system detecting a multi-component feedback signal, according to the disclosed subject matter.

As shown in FIG. 1D, the reduced incident wave 180 reflects off the distal end 175 of the beam 170 resulting in a reflected wave 185, which is not directly addressed by the suppression wave 190. Furthermore, after generation of the reflected wave 185, the sensor 120 outputs a signal influenced by multiple wave components present in the beam 170, including the incident wave 180, the suppression wave 190, the reflected wave 185, and a near field evanescent wave (not shown), all of which may cause different responses at different frequency bands.

In order to completely absorb the effects of the incident wave 180, the suppression wave 190, and the reflected wave 185, the neural network module 250 includes a neural network 255 trained to determine a transfer function, across a broad frequency bandwidth, between a voltage $V_a$ applied to the actuator 130 (e.g., initially to generate the suppression wave 190) and a voltage $V_s$ detected by the sensor 120 within the context of the beam 170.

To determine the transfer function, assuming the beam 170 has a bending stiffness EI, a density ρ, and a cross-section A, a background displacement wave field $w_i$ of an incident wave can be expressed as:

$$w_i = w_0 e^{ikx} \qquad \text{Eq. 1}$$

where k is the wave number of flexural waves propagating in the beam 170, defined by:

$$k^4 = \omega^2 \rho A / EI \qquad \text{Eq. 2}$$

In the absence of any control element (e.g., passive dampening material or suppression wave 190), the incident wave 180 will propagate to the beam end 175 and be totally reflected, with the reflected wave field $w_r$ defined as:

$$w_r = w_0^r e^{-ikx} \qquad \text{Eq. 3}$$

When the controller 160 transmits a signal to the actuator 130 to generate a voltage $V_a$ at or close to a distal end 175 of the beam 170, it will generate an actuated wave field $w_a$ defined as:

$$w_a = V_a k_a \qquad \text{Eq. 4}$$

where $K_a$ is the effective electromechanical coupling coefficient of the actuator 130. As previously mentioned, the signal detected by the sensor 120 will be a result of multiple components, including voltage $V_b$ induced by the background wave (i.e., result of the incident wave and reflected wave) and voltage $V_f$ due to the feedback from the actuator. The cumulative sensed voltage $V_s$ can be expressed as:

$$V_s = V_b + V_f \qquad \text{Eq. 5}$$

The total wave field on the beam will be the summation of the above wave fields, and the reflection coefficient r, can be calculated as:

$$r = \frac{w_a + w_0^r}{w_0} \qquad \text{Eq. 6}$$

Through the objective function min(r(ω)), i.e., minimizing the reflection coefficient, the transfer function H between $V_a$ and $V_s$ can be defined as:

$$H = \frac{V_a}{V_s} \qquad \text{Eq. 7}$$

The neural network module 250 can train the neural network 255 to learn the transfer function of the flexural wave absorption system 100 (i.e., between $V_a$ and $V_s$) at multiple frequencies. In one or more embodiments, the neural network module 250 can use multiple filters, such as infinite impulse response (IIR) filters, to approximate the frequency response of the flexural wave absorption system 100 at different frequency intervals in order to increase the overall learned frequency range.

Figure 3:
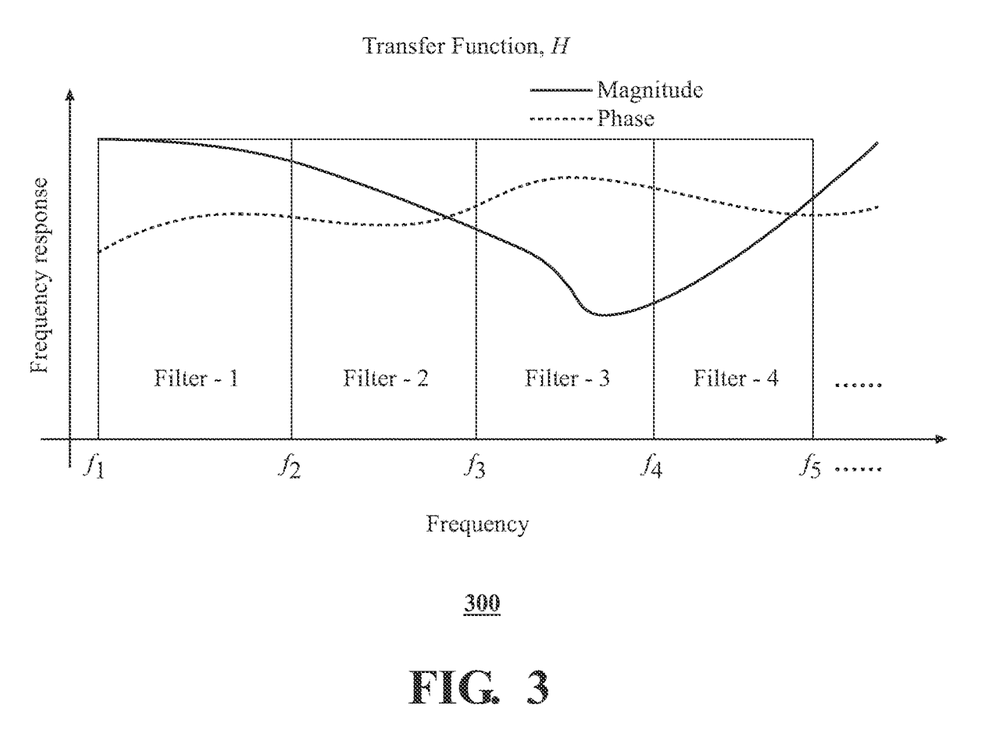
FIG. 3 illustrates an example plot of a broadband transfer function, according to the disclosed subject matter.

FIG. 3 shows a plot 300 of an assumed transfer function, H, obtained from simulation or experiment. The neural network module 250 can use multiple filters, such as IIR filters, to approximate the frequency response at different frequency intervals, e.g., filter-1 having a range from $f_1$ to $f_2$, filter-2 having a range from $f_2$ to $f_3$, and so on. The neural network module 250 obtains the filters' coefficients and uses the filters to generate time-series training data 270, e.g., by inputting sine-modulated chirp signals. In one or more embodiments, the neural network module 250 can use the time-series training data 270 to train the neural network 255.

Referring back to FIG. 1D, with the trained neural network 255 the neural network module 250 can input $V_s$ into the neural network 255 to determine an appropriate $V_a$ and generate a cancellation wave. In one or more embodiments, the neural network 255 is a recurrent neural network (RNN). In one or more embodiments, the neural network module 250 can add an input delay to improve performance of the neural network 255. For example, if the sample rate of the sensor 120 is below a threshold, adding a time delay to an input of the neural network 255 can improve an accuracy of the neural network 255.

The disclosed flexural wave absorption system 100 therefore derives a transfer function based on flexural wave propagation in the beam 170 and does not use structural information related to the beam 170 length, since the wave number used in deriving the transfer function depends on bending stiffness EI, density ρ, and cross-section A. In this regard, the disclosed embodiments present a versatile, model-free approach that can readily be applied to beams of different lengths without the need to change or adjust the controller 160 or retrain the neural network 255.

Accordingly, the disclosed flexural wave absorption system 100 can function as an active flexural wave absorber that can measure flexural waves and then generate an appropriate cancellation wave that effectively absorbs the flexural wave. Furthermore, the disclosed embodiments can suppress vibration by deploying the above-described techniques to prevent wave reflections that can form a standing wave in a beam.

Figure 4:
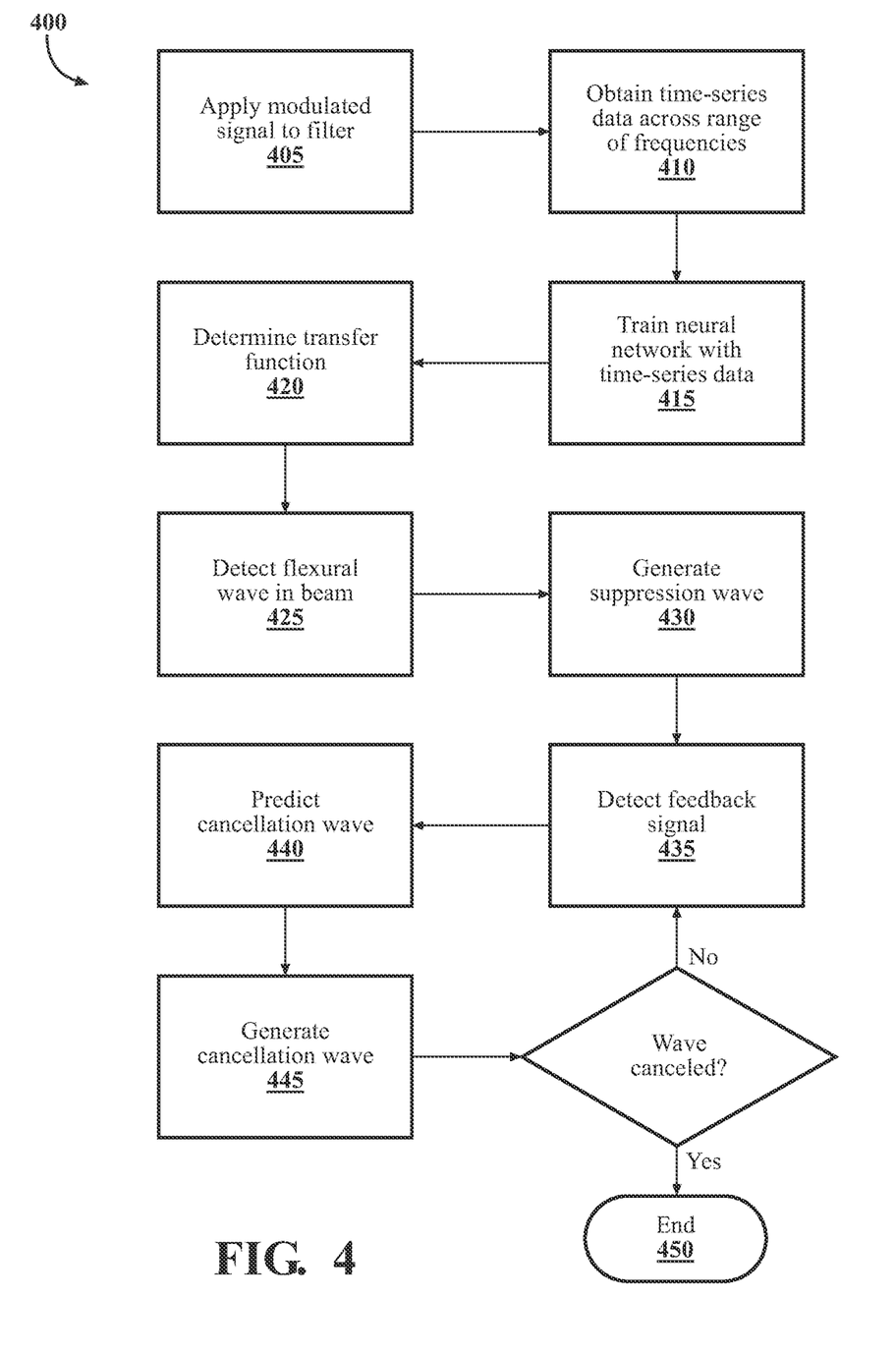
FIG. 4 illustrates an example flowchart of a method of absorbing a flexural wave, according to the disclosed subject matter.

Additional and optional features of the flexural wave absorption system 100 will now be discussed. FIG. 4 illustrates a flowchart of a method 400 of absorbing a flexural wave according to the disclosed embodiments. Method 400 will be discussed from the perspective of the controller 160 of FIGS. 1A-1D and 2. While method 400 is discussed in combination with the flexural wave absorption system 100, it should be appreciated that the method 400 is also not limited to being implemented within the flexural wave absorption system 100 but is instead one example of a system that may implement the method 400.

At operation 405, with the flexural wave absorption system 100 connected to the beam 170, the controller 160 (e.g., neural network module 250) uses a filter (e.g., IIR filter) to apply a modulated signal (e.g., a sine-modulated chirp signal) to obtain time-series response data for a given frequency range.

At operation 410, the controller 160 (e.g., neural network module 250) obtains time-series response data in multiple frequency band ranges, e.g., by using multiple IIR filters. Each IIR filter can approximate a frequency domain transfer function at different intervals.

At operation 415, the controller 160 (e.g., neural network module 250) trains the neural network 255 using the time-series data as training data At operation 420, the controller 160 (e.g., neural network module 250) determines a transfer function between an actuator voltage $V_a$ and a sensed voltage $V_s$ for the flexural wave absorption system 100, as implemented with the beam 170.

At operation 425, the flexural wave absorption system 100 (e.g., sensor 120) detects an incident flexural wave propagating in the beam 170. In one or more embodiments, the sensor 120 is implemented as a piezoelectric patch that outputs a voltage signal $V_s$ in response to the incident wave.

At operation 430, the flexural wave absorption system 100 (e.g., wave module 240) generates a suppression wave that counters the incident wave, and thereby reduces a reflection coefficient of the incident wave. In one or more embodiments, the wave module 240 includes instructions to cause the processor 210 to determine an amplitude and a phase of the incident wave based on the voltage signal $V_s$ and transmit a voltage signal $V_a$ to the actuator 130 to generate the suppression wave. In one or more embodiments, the suppression wave is generated to have a phase opposite to the phase of the incident wave and an amplitude approximately equal to the amplitude of the incident wave.

At operation 435, the controller 160 (e.g., neural network module 250) detects a feedback signal from the sensor 120. In one or more embodiments, the feedback signal indicates multiple wave components present in the beam 170, including the suppression wave, the incident wave and a reflected wave resulting from the incident wave reflecting from an end of the beam 170.

At operation 440, the controller 160 (e.g., neural network module 250) predicts parameters for generating a cancellation wave signal. In one or more embodiments, the neural network module 250 inputs the feedback signal into the trained neural network 255, and the neural network 255 predicts a voltage signal $V_a$ to generate a cancellation wave. In one or more embodiments, the neural network module 250 adds a time delay to inputs to the neural network 255 when utilizing the neural network 255 to predict the voltage $V_a$ to generate the cancellation wave.

At operation 445, the controller 160 (e.g., neural network module 250) controls the actuator 130 to generate the cancellation wave. In one or more embodiments, the neural network module 250 transmits the predicted voltage signal $V_a$ to the actuator 130, which in turn generates the cancellation wave.

Next, the controller 160 (e.g., neural network module 250) determines whether the incident wave has been canceled. If not, the process proceeds to operation 435 to read the feedback signal then predict and apply another cancellation wave. Any subsequent cancellation wave will increase in effectiveness. When the incident wave has effectively been canceled (e.g., by at least a threshold amount), then the process ends at 450.

The system 100 can include one or more modules, at least some of which are described herein. The modules can be implemented as computer-readable program code that, when executed by a processor 210, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, the database 230 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-1D and 2-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A flexural wave absorption system, comprising:
   a sensor configured to be connected to a beam;
   an actuator configured to be connected to the beam;
   a processor; and
   a memory communicably coupled to the processor and storing:
      a wave module including instructions that when executed by the processor cause the processor to:
         determine an amplitude and a phase of an incident wave propagating in the beam based on a signal from the sensor; and
         control the actuator to generate a suppression wave, based on the amplitude and the phase of the incident wave; that reduces a coefficient of reflection of the incident wave resulting in a reflected wave; and
      a neural network module including instructions that when executed by the processor cause the processor to:
         determine that a sampling rate of the sensor is less than a threshold;
         cause in response to a determination that the sampling rate is less than the threshold, a time delay to be imposed on a feedback signal input into a neural network to predict a voltage Va to apply to the actuator to generate a cancellation wave, wherein the feedback signal is received from the sensor; and
         control the actuator to generate the cancellation wave based on the time-delayed feedback signal that indicates multiple wave components present in the beam, the multiple wave components including the incident wave, the suppression wave, and the reflected wave.

2. The flexural wave absorption system of claim 1, wherein the cancellation wave is configured to cancel the multiple wave components indicated by the feedback signal.

3. The flexural wave absorption system of claim 1, wherein:
   the neural network module further includes instructions to train the neural network to determine a transfer function between the voltage V applied to the actuator and a voltage is detected by the sensor, and the neural network is configured to predict the voltage V to generate the cancellation wave based on the transfer function.

4. The flexural wave absorption system of claim 3, wherein the instructions to train the neural network include instructions to obtain time-series data to train the neural network by applying sine-modulated signals to multiple filters that approximate frequency responses across a range of multiple frequencies.

5. The flexural wave absorption system of claim 4, wherein the neural network is implemented as a recurrent neural network, the multiple filters are implemented as infinite impulse response filters, and both the sensor and the actuator are implemented as piezoelectric patches.

6. A method of absorbing a flexural wave, comprising:
- detecting, with a sensor attached to a beam, an incident wave propagating in the beam;
- determining, based on a signal from the sensor generated in response to the incident wave, an amplitude and a phase of the incident wave;
- controlling an actuator, connected to the beam, to generate a suppression wave, based on the amplitude and the phase of the incident wave, that reduces a coefficient of reflection of the incident wave resulting in a reflected wave;
- determining that a sampling rate of the sensor is less than a threshold:
- causing, in response to a determination that the sampling rate is less than the threshold, a time delay to be imposed on a feedback signal input into a neural network to predict a voltage Va to apply to the actuator to generate a cancellation wave, wherein the feedback signal is received from the sensor; and
- controlling the actuator to generate the cancellation wave based on the time-delayed feedback signal that indicates multiple wave components present in the beam, the multiple wave components including the incident wave, the suppression wave, and the reflected wave.

7. The method of claim 6, wherein the cancellation wave cancels the multiple wave components indicated by the feedback signal.

8. The method of claim 6, further comprising:
- training the neural network to determine a transfer function between the voltage applied to the actuator and a voltage $V_s$ detected by the sensor; and
- predicting, via the neural network, the voltage Va to generate the cancellation wave based on the transfer function.

9. The method of claim 8, wherein the training the neural network comprises obtaining time-series data to train the neural network by applying sine-modulated signals to multiple filters that approximate frequency responses across a range of multiple frequencies.

10. The method of claim 9, wherein the neural network is implemented as a recurrent neural network, the multiple filters are implemented as infinite impulse response filters, and both the sensor and the actuator are implemented as piezoelectric patches.

11. A non-transitory computer-readable medium for absorbing a flexural wave, including instructions that, when executed by one or more processors, cause the one or more processors to:
- receive, from a sensor attached to a beam, a signal generated in response to an incident wave propagating in the beam;
- determine, based on the signal, an amplitude and a phase of the incident wave;
- control an actuator, connected to the beam, to generate a suppression wave, based on the amplitude and the phase of the incident wave, that reduces a coefficient of reflection of the incident wave resulting in a reflected wave;
- determine that a sampling rate of the sensor is less than a threshold;
- cause, in response to a determination that the sampling rate is less than the threshold, a time delay to be imposed on a feedback signal input into a neural network to predict a voltage Va to apply to the actuator to generate a cancellation wave, wherein the feedback signal is received from the sensor; and
- control the actuator to generate the cancellation wave based on the time-delayed feedback signal that indicates multiple wave components present in the beam, the multiple wave components including the incident wave, the suppression wave, and the reflected wave.

12. The non-transitory computer-readable medium of claim 11, wherein the cancellation wave is configured to cancel the multiple wave components indicated by, the feedback signal.

13. The non-transitory computer-readable medium of claim 11, further comprising instructions to:
- train the neural network to determine a transfer function between the voltage $V_a$ applied to the actuator and a voltage $V_s$ detected by the sensor; and
- predict, via the neural network, the voltage $V_a$ to generate the cancellation wave based on the transfer function.

14. The non-transitory computer-readable medium of claim 13, wherein the instructions to train the neural network include instructions to obtain time-series data to train the neural network by applying sine-modulated signals to multiple filters that approximate frequency responses across a range of multiple frequencies.

15. A system, comprising:
- a processor; and
- a memory storing a neural network and a module, wherein the module includes instructions that cause the processor to:
  - determine that a sampling rate, of a sensor configured to detect an incident wave propagating in a beam, is less than a threshold; and
  - cause, in response to a determination that the sampling rate is less than the threshold, a time delay to be imposed on a feedback signal, from the sensor, input into the neural network configured to predict a voltage Va to apply to an actuator configured to generate a cancellation wave.

16. The system of claim 15, wherein the module further includes instructions to:
- determine an amplitude and a phase of the incident wave propagating in the beam based on a signal from the sensor;
- control the actuator to generate a suppression wave, based on the amplitude and the phase of the incident wave, that reduces a coefficient of reflection of the incident wave, but fails to completely absorb the incident wave resulting in a reflected wave; and
- control the actuator to generate the cancellation wave based on feedback signal that indicates multiple wave components present in the beam, the multiple wave components including the incident wave, the suppression wave, and the reflected wave.

17. The system of claim 16, wherein the cancellation wave is configured to cancel the multiple wave components indicated by the feedback signal.

18. The system of claim 15, wherein:
the module further includes instructions to train the neural network to determine a transfer function between the voltage $V_a$ applied to the actuator and a voltage $V_s$ detected by the sensor, and
the neural network is configured to predict the voltage Via to generate the cancellation wave based on the transfer function.

19. The system of claim 18, wherein the instructions to train the neural network include instructions to obtain time-series data to train the neural network by applying sine-modulated signals to multiple filters that approximate frequency responses across a range of multiple frequencies.

20. The system of claim 19, wherein the neural network is implemented as a recurrent neural network, the multiple filters are implemented as infinite impulse response filters, and both the sensor and the actuator are implemented as piezoelectric patches.

* * * * *

UNITED STATES PATENT AND TRADEMARK OFFICE
CERTIFICATE OF CORRECTION

PATENT NO. : 11,940,417 B2
APPLICATION NO. : 17/165390
DATED : March 26, 2024
INVENTOR(S) : Xiaopeng Li et al.

It is certified that error appears in the above-identified patent and that said Letters Patent is hereby corrected as shown below:

In the Claims

Claim 1, Column 10, Line 35: delete "wave; that" and insert --wave, that--.

Claim 3, Column 10, Line 63: delete "voltage V applied" and insert --voltage Va applied--.

Claim 3, Column 10, Line 64: delete "voltage is detected" and insert --voltage Vs detected--.

Claim 3, Column 10, Line 65: delete "voltage V to" and insert --voltage Va to--.

Claim 8, Column 11, Line 41: delete "voltage applied" and insert --voltage Va applied--.

Claim 18, Column 13, Line 6: delete "voltage Via" and insert --voltage Va--.

Signed and Sealed this
Twenty-third Day of April, 2024

Katherine Kelly Vidal
*Director of the United States Patent and Trademark Office*